United States Patent
Deng

(10) Patent No.: US 11,139,735 B2
(45) Date of Patent: Oct. 5, 2021

(54) DRIVE CIRCUIT, DRIVE METHOD AND INTEGRATED CIRCUIT THEREOF

(71) Applicant: Silergy Semiconductor Technology (Hangzhou) LTD, Hangzhou (CN)

(72) Inventor: Fuhua Deng, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/986,451

(22) Filed: Aug. 6, 2020

(65) Prior Publication Data

US 2021/0050779 A1  Feb. 18, 2021

(30) Foreign Application Priority Data

Aug. 15, 2019  (CN) .......................... 201910754639.1

(51) Int. Cl.
    *G05F 1/10* (2006.01)
    *G05F 3/02* (2006.01)
    *H02M 3/07* (2006.01)

(52) U.S. Cl.
    CPC ............ *H02M 3/073* (2013.01); *H02M 3/077* (2021.05)

(58) Field of Classification Search
    CPC .................... H02M 3/073; H02M 2003/077
    USPC ......................................................... 327/536
    See application file for complete search history.

(56) References Cited

U.S. PATENT DOCUMENTS

| | | | |
|---|---|---|---|
| 6,256,215 B1 * | 7/2001 | Barrett ............... | H03K 17/6871 363/132 |
| 8,450,979 B2 | 5/2013 | Kerr et al. | |
| 9,479,060 B2 | 10/2016 | Deng | |
| 9,559,542 B2 | 1/2017 | Deng | |
| 9,654,005 B2 | 5/2017 | Deng | |
| 9,716,434 B2 | 7/2017 | Deng | |
| 9,769,888 B2 | 9/2017 | Wang et al. | |
| 9,819,270 B2 | 11/2017 | Deng | |
| 10,637,355 B1 * | 4/2020 | Shao ..................... | H02M 3/158 |
| 2008/0231233 A1 | 9/2008 | Thornton | |
| 2014/0152239 A1 | 6/2014 | Yao et al. | |
| 2014/0203763 A1 | 7/2014 | Zhao et al. | |
| 2016/0233713 A1 | 8/2016 | Cheng | |
| 2017/0353105 A1 * | 12/2017 | Solie ...................... | H02M 3/07 |

FOREIGN PATENT DOCUMENTS

CN           101718844 A        12/2009

* cited by examiner

*Primary Examiner* — Metasebia T Retebo
(74) *Attorney, Agent, or Firm* — Michael C. Stephens, Jr.

(57) ABSTRACT

A drive circuit for a switch capacitor converter having first, second, third, and fourth power switches connected in series, can include: first, second, third, and fourth drivers configured to respectively drive the first, second, third power, and fourth power switches according to control signals; a bootstrap power supply circuit comprising a bootstrap capacitor configured to supply power to the first, second, and third drivers in a time-sharing manner; and a power supply configured to supply power to the fourth driver and charge the bootstrap capacitor, where the fourth power switch is grounded.

18 Claims, 8 Drawing Sheets

DRIVE CIRCUIT, DRIVE METHOD AND INTEGRATED CIRCUIT THEREOF

RELATED APPLICATIONS

This application claims the benefit of Chinese Patent Application No. 201910754639.1, filed on Aug. 15, 2019, which is incorporated herein by reference in its entirety.

FIELD OF THE INVENTION

The present invention generally relates to the field of power electronics, and more particularly to drive circuits and methods.

BACKGROUND

Switch capacitor converters have advantages of relatively low input current, no large-scale power inductors, relatively low switching transistor voltage stress, and relatively high efficiency. Thus, switch capacitor converters are widely used today in fast charging technology for mobile devices, such as mobile phones.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
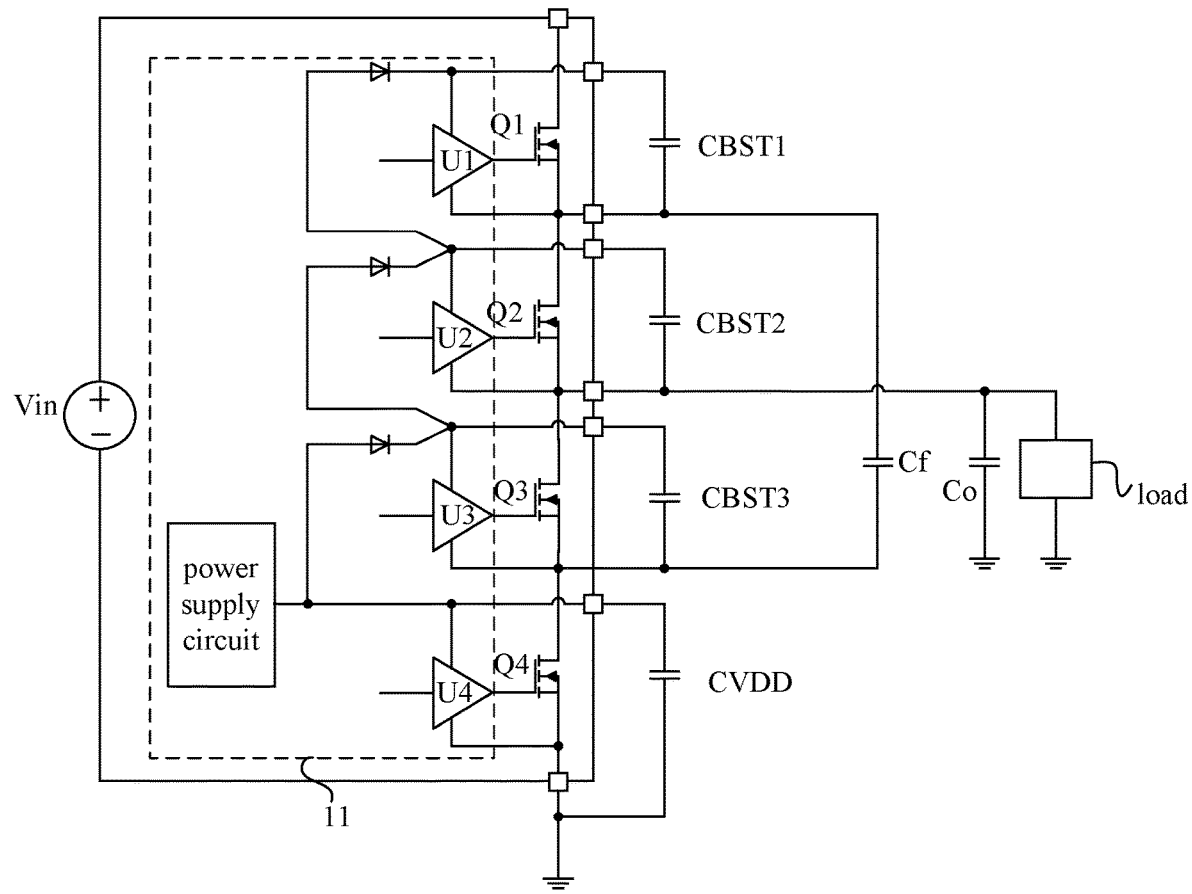
FIG. 1 is a schematic block diagram of an example switch capacitor converter with a drive circuit.

Referring now to FIG. 1, shown is a schematic block diagram of an example switch capacitor converter with a drive circuit. In this example, the single-phase switch capacitor converter can include four switches, and each switch has an independent driver since the potential of each switch is different. Drive circuit 11 of the switches may provide a relatively large drive current, so the traditional integrated circuit (IC) of the switch capacitor converter would utilize three external bootstrap capacitors (e.g., CBST1, CBST2, and CBST3). The higher-power two-phase switch capacitor converter may need more external bootstrap capacitors due to the increase of the switches. In addition, the IC of the switch capacitor converter may need to provide more pins along with the increase of external bootstrap capacitors, which makes miniaturization of the IC difficult, and thus applications of the IC in small devices, such as mobile phones, may be limited.

In one embodiment, a drive circuit for a switch capacitor converter having first, second, third, and fourth power switches connected in series, can include: (i) first, second, third, and fourth drivers configured to respectively drive the first, second, third power, and fourth power switches according to control signals; (ii) a bootstrap power supply circuit comprising a bootstrap capacitor configured to supply power to the first, second, and third drivers in a time-sharing manner; and (iii) a power supply configured to supply power to the fourth driver and charge the bootstrap capacitor, where the fourth power switch is grounded.

Figure 2:
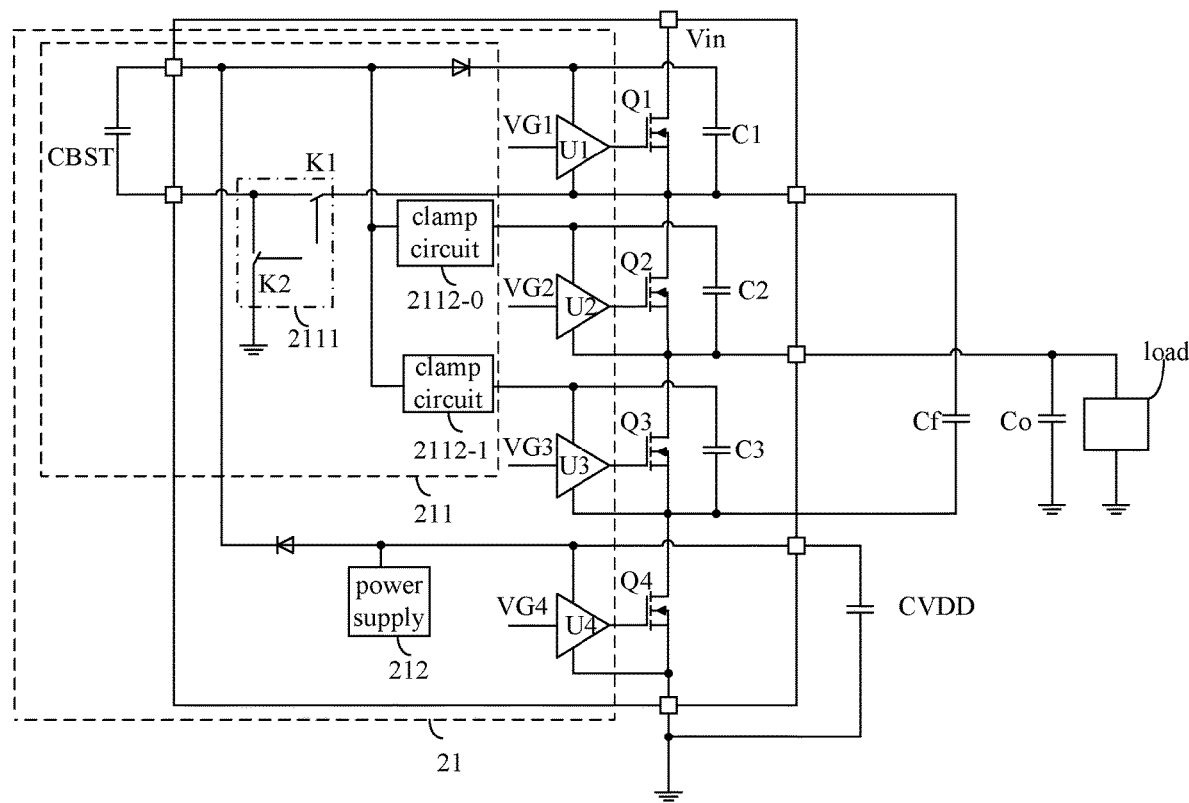
FIG. 2 is a schematic block diagram of an example of a switch capacitor converter with a drive circuit, in accordance with embodiments of the present invention.

Referring now to FIG. 2, shown is a schematic block diagram of an example switch capacitor converter with a drive circuit, in accordance with embodiments of the present invention. In this particular example, the switch capacitor converter can include drive circuit 21, power switches Q1-Q4, flying capacitor Cf, and output capacitor Co. Power switches Q1-Q4 may sequentially be connected in series between the first terminal and the second terminal (e.g., the ground terminal) of the input port. One end of flying capacitor Cf can connect to the common node of power switches Q1 and Q2, and the other end of flying capacitor Cf can connect to the common node of power switches Q3 and Q4. One end of output capacitor Co can connect to the common node of power switches Q2 and Q3, and the other end of output capacitor Co can connect to the ground terminal. In particular embodiments, power switches Q1-Q4 can use any suitable electrically controllable switch (e.g., a metal-oxide-semiconductor field-effect transistor (MOSFET), a bipolar-junction transistor (BJT), insulated gate bipolar transistor (IGBT), etc.).

In this example, power switches Q1 and Q3 can be controlled to be turned on simultaneously, power switches Q2 and Q4 can be controlled to be turned on simultaneously, and the on time intervals of power switches Q1 and Q2 may not be overlapped. The duty cycles of control signal VG1 of power switch Q1 and control signal VG3 of power switch Q3 can be equal, and the duty cycles of control signal VG2 of power switch Q2 and control signal VG4 of power switch Q4 can be equal. The on time intervals of power switches Q1 and Q2 may be controlled by duty cycles of the switch capacitor converter. Drive circuit 21 can include drivers U1, U2, U3, U4, bootstrap power supply circuit 211, and power supply 212. For example, drivers U1, U2, U3, and U4 can generate drive signals according to control signals VG1-VG4 of power switches Q1-Q4, in order to respectively drive power switch Q1-Q4.

Bootstrap power supply circuit 211 can include bootstrap capacitor CBST, which can supply power to drivers U1, U2, and U3 in a time-sharing manner. Furthermore, bootstrap power supply circuit 211 can supply power to drivers U1 and U3 at the same time during a first part of time interval T1 in an operation cycle, and may power to driver U2 during a first part of time interval T2 in the operation cycle. In addition, bootstrap capacitor CBST of bootstrap power supply circuit 211 can be charged by power supply 212 during a second part of time interval T1 and/or during a second part of time interval T2 in the operation cycle. That is, bootstrap capacitor CBST can be charged during a second part of time interval T1 in the operation cycle, during a second part of time interval T2 in the operation cycle, and/or charged during a second part of time interval T1 and a second part of time interval T2, in the operation cycle.

Power supply 212 can supply power to driver U4 and charge bootstrap capacitor CBST, where power switch Q4 is grounded. Since one end of power switch Q4 is grounded, it is more convenient to drive power switch Q4. The low voltage end of driver U4 may be grounded, and a drive voltage of power switch Q4 can be provided by power supply 212 at the high voltage end of driver U4, so driver U4 can output the drive voltage to drive power switch Q4 when control signal VG4 is active. For example, power supply 212 can be implemented by a liner regulator (e.g., a low-dropout regulator [LDO]). For example, bootstrap capacitor CBST can be coupled between the high voltage end and the low voltage end of driver U1, and also to the high voltage ends of drivers U2 and U3.

Bootstrap power supply circuit 211 can include switch circuit 2111 for switching the connection point of one end of bootstrap capacitor CBST. Switch circuit 2111 can include switches K1 and K2. For example, switch K1 can connect between one end of bootstrap capacitor CBST and the common node of power switches Q1 and Q2, and switch K2 can connect between one end of bootstrap capacitor CBST and the ground. When bootstrap power supply circuit 211 supplies power to drivers U1 and U3, or supplies power to driver U2, one end of bootstrap capacitor CBST can couple to the common node of power switches Q1 and Q2. That is, bootstrap capacitor CBST can couple in parallel with driver U1, and when power supply 212 charges bootstrap capacitor CBST, one end of bootstrap capacitor CBST can couple to the ground.

Bootstrap power supply circuit 211 can also include clamp circuits 2112-0 and 2112-1. For example, bootstrap capacitor CBST can couple to the high voltage ends of drivers U2 and U3 respectively through clamp circuits 2112-0 and 2112-1. Bootstrap capacitor CBST can couple to the high voltage end of driver U2 through one clamp circuit 2112-0, and bootstrap capacitor CBST can connect to the high voltage end of driver U3 through clamp circuit 2112-1. Since the potentials across power switches Q2 and Q3 are different, the potentials of the low voltage ends of drivers U2 and U3 may also be different. Therefore, it may be necessary to clamp the output voltages of drivers U2 and U3 to the predetermined value through clamp circuits 2112-0 and 2112-1, and the predetermined value can be the drive voltage that meets the driving requirements of power switches Q2 and Q3. Further, the predetermined value can be equal to the output voltage of power supply 212.

Figure 3:
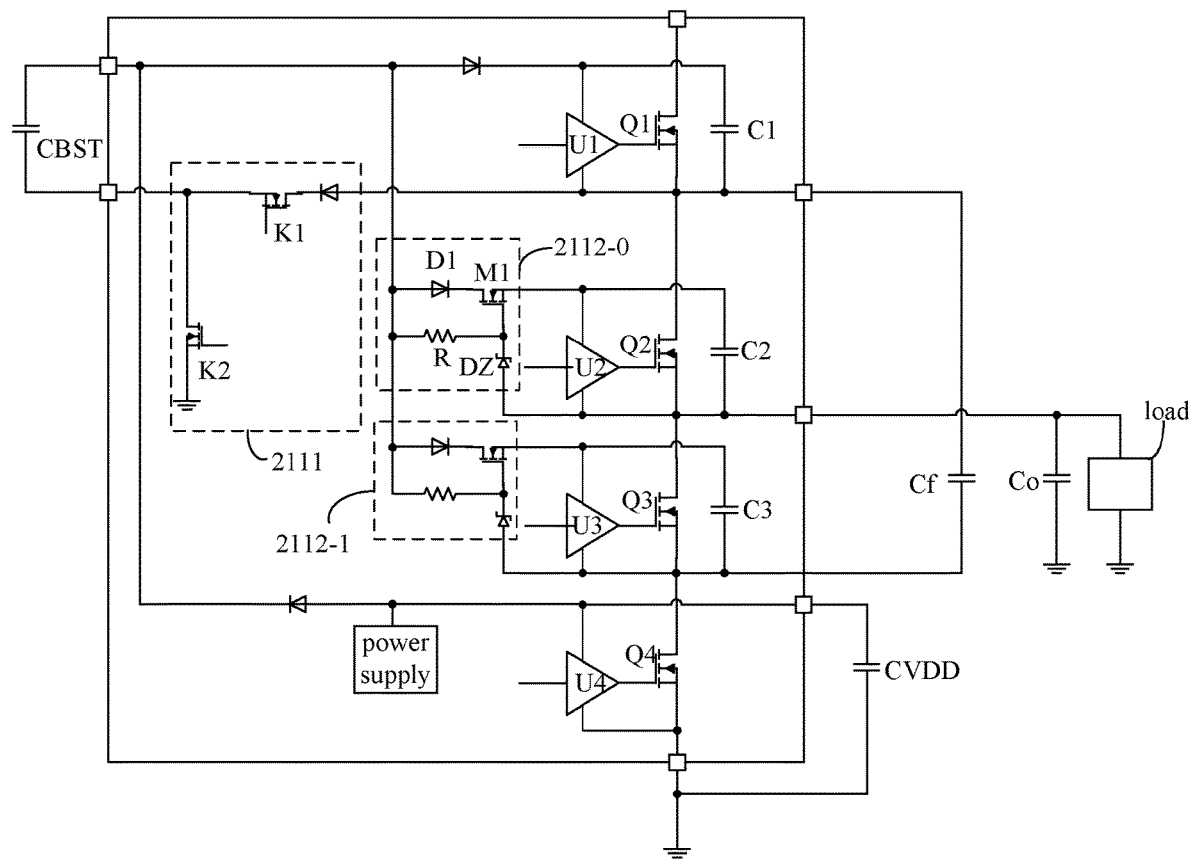
FIG. 3 is a schematic block diagram of an example clamp circuit, in accordance with embodiments of the present invention.

Referring now to FIG. 3, shown is a schematic block diagram of an example clamp circuit, in accordance with embodiments of the present invention. In this particular example, each clamp circuit 2112 (e.g., 2112-0) can include diode D1, transistor M1, Zener diode DZ, and resistor R. For example, the anode of diode D1 can connect to bootstrap capacitor CBST, the cathode of diode D1 can connect to one power end of transistor M1, and the other power end of transistor M1 can connect to the high voltage end of the corresponding driver. One end of resistor R can connect to the anode of diode D1, and the other end of resistor R can connect to the control end of transistor M1. The cathode of Zener diode DZ can connect to the control end of transistor M1, and the anode of Zener diode DZ can connect to the low voltage end of the corresponding driver. Driver U1 may not need to adjust the drive voltage of power switch Q1 through clamp circuit 2112, since bootstrap capacitor CBST can be coupled between the high voltage and low voltage ends of driver U1. When control signal VG1 is active, driver U1 can output the voltage between the two ends of bootstrap capacitor CBST, in order to drive power switch Q1.

In this example, drive circuit 21 can supply power to drivers U1 and U3 at the same time during a first part of time interval T1 in an operation cycle, and may supply power to driver U2 during a first part of time interval T2 in the operation cycle. In addition, bootstrap capacitor CBST can be charged by power supply 212 during a second part of time interval T1, and/or a second part of time interval T2, in the operation cycle. In addition, driver U4 may be powered by power supply 212. In this way, the drive voltages of drivers U1-U4 can be the same voltage. Therefore, drive circuit 21 may utilize a time-sharing control method, in order to supply power to drivers U1-U4 of power switches Q1-Q4, such that only one bootstrap capacitor is required to drive power switches Q1-Q4. Also, the drive voltage of each driver may be the same when power switches do not share a common ground, which can simplify the drive circuit of the switch capacitor converter, reduce the number of drive components, and save circuit costs.

Figure 4:
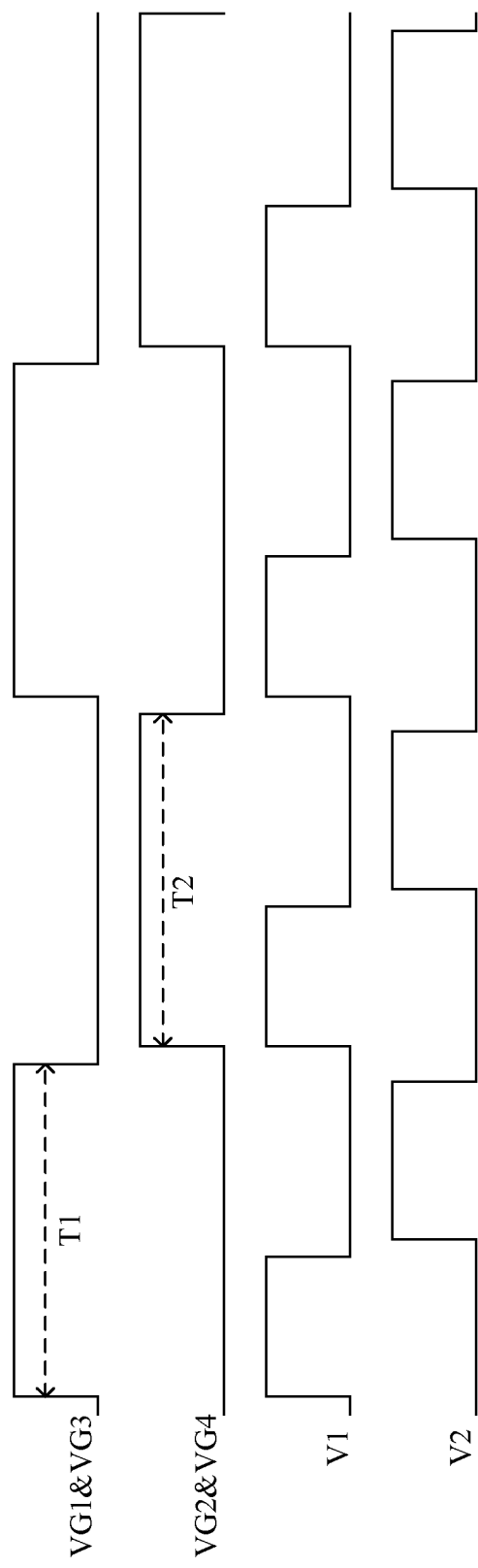
FIG. 4 is a waveform diagram of an example operation of the switch capacitor converter, in accordance with embodiments of the present invention.

Referring now to FIG. 4, shown is a waveform diagram of example operation of the switch capacitor converter, in accordance with embodiments of the present invention. For example, VG1-VG4 may represent the control signals of power switches Q1-Q4, respectively, V1 may represent the control signal of switch K1, and V2 may represent the control signal of switch K2. An example operation process of the switch capacitor converter of particular embodiments will be described in detail below in conjunction with the waveform diagram.

Figure 5:
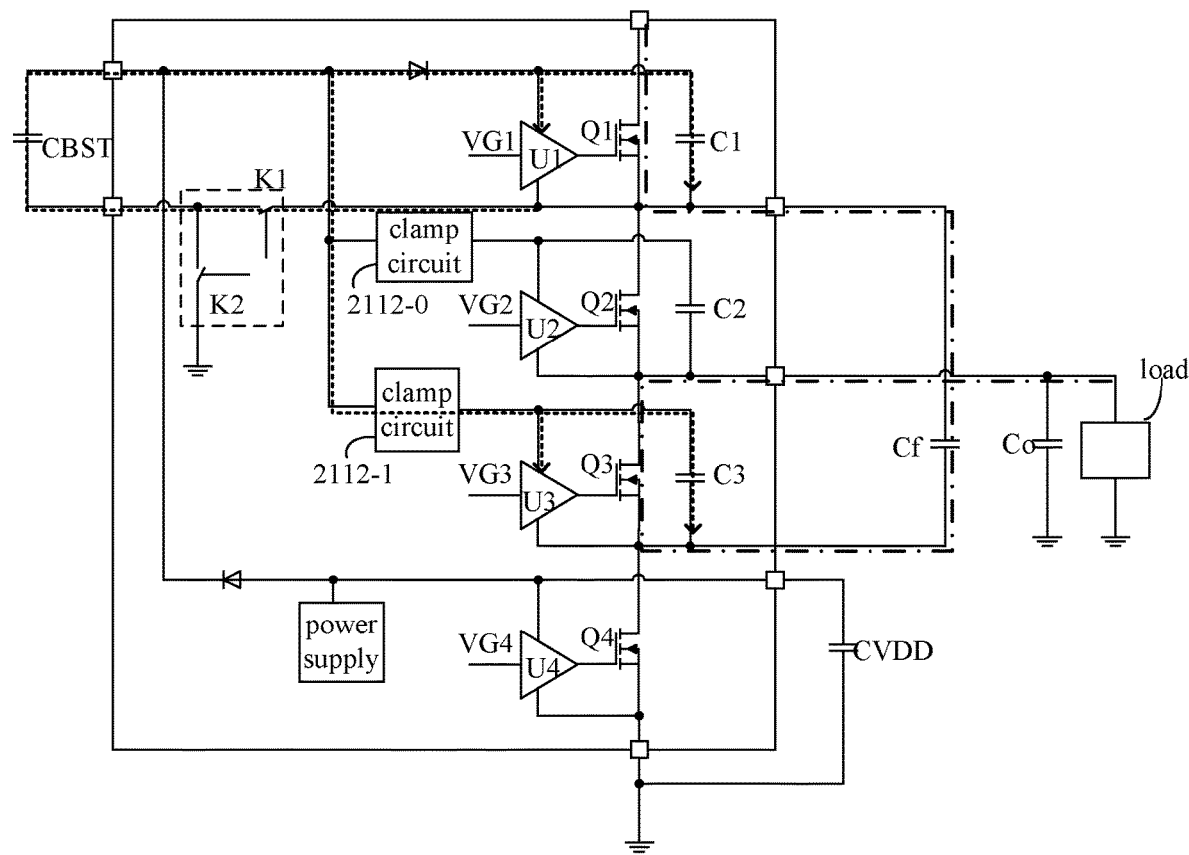
FIG. 5 is a schematic block diagram of example operation of the switch capacitor converter in the first time interval, in accordance with embodiments of the present invention.

Referring now to FIG. 5, shown is a schematic block diagram of example operation of the switch capacitor converter in the first time interval, in accordance with embodiments of the present invention. In this example, the switch capacitor converter may operate during a first part of time interval T1. Control signals VG1 and VG3 respectively corresponding to power switches Q1 and Q3 can both be active (e.g., VG1=1, VG3=1), and control signals VG2 and VG4 respectively corresponding to power switches Q2 and Q4 may both be inactive (e.g., VG2=0, VG4=0), during a first part of time interval T1. In this example, control signal with logic '1' represents an active high level, and control signal with '0' represents an inactive low level. Here, the dashed line is the power supply path for the drive circuit to supply power to the drivers, and the dotted line is the power path of the switch capacitor converter.

Switch K1 in switch circuit 2111 can be controlled by control signal V1. During a first part of time interval T1, control signal V1 can be at a high level, and switch K1 may be turned on, so one end of bootstrap capacitor CBST can effectively connect to the low voltage end of driver U1. Bootstrap capacitor CBST can supply power to driver U1 of power switch Q1, and control signal VG1 of power switch Q1 may be equal to 1, so driver U1 can activate a drive signal to drive power switch Q1 to turn on. In general, the voltage across flying capacitor Cf is ½*Vin. At this stage, power switch Q1 can be turned on, and the voltage at the first end of flying capacitor Cf may be Vin, such the voltage at the second end of flying capacitor Cf is ½*Vin. During a first part of time interval T1, control signal VG3 of power switch Q3 can be equal to 1, and bootstrap capacitor CBST may supply power to driver U3 of the power switch Q3 through clamp circuit 2112-1 corresponding to driver U3, so driver U3 may activate the drive signal to drive power switch Q3 to turn on.

At this stage, the low voltage end of driver U3 is ½ *Vin, and the voltage at the first end of bootstrap capacitor CBST can be the sum of the voltage across bootstrap capacitor CBST and Vin. Thus, the input voltage of clamp circuit 2112-1 corresponding to driver U3 with respect to the low voltage end of driver U3 (not with respect to the ground) at this stage can be the sum of the voltage across bootstrap capacitor CBST and the voltage across flying capacitor Cf. In addition, clamp circuit 2112-1 corresponding to driver U3 may reduce its output voltage to the acceptable operating voltage of driver U3 or to be equal to the voltage across bootstrap capacitor CBST, such as by linear voltage regulation. During time interval T1, power switches Q1 and Q3 can be turned on, and input voltage Vin may supply power to the load via Q1-Cf-Q3-load. In addition, power switches Q1 and Q3 can respectively correspond to an internal capacitor, and bootstrap capacitor CBST may further supply power to internal capacitors C1 and C3 corresponding to power switches Q1 and Q3 during the first part of time interval T1 in the operation cycle.

Figure 6:
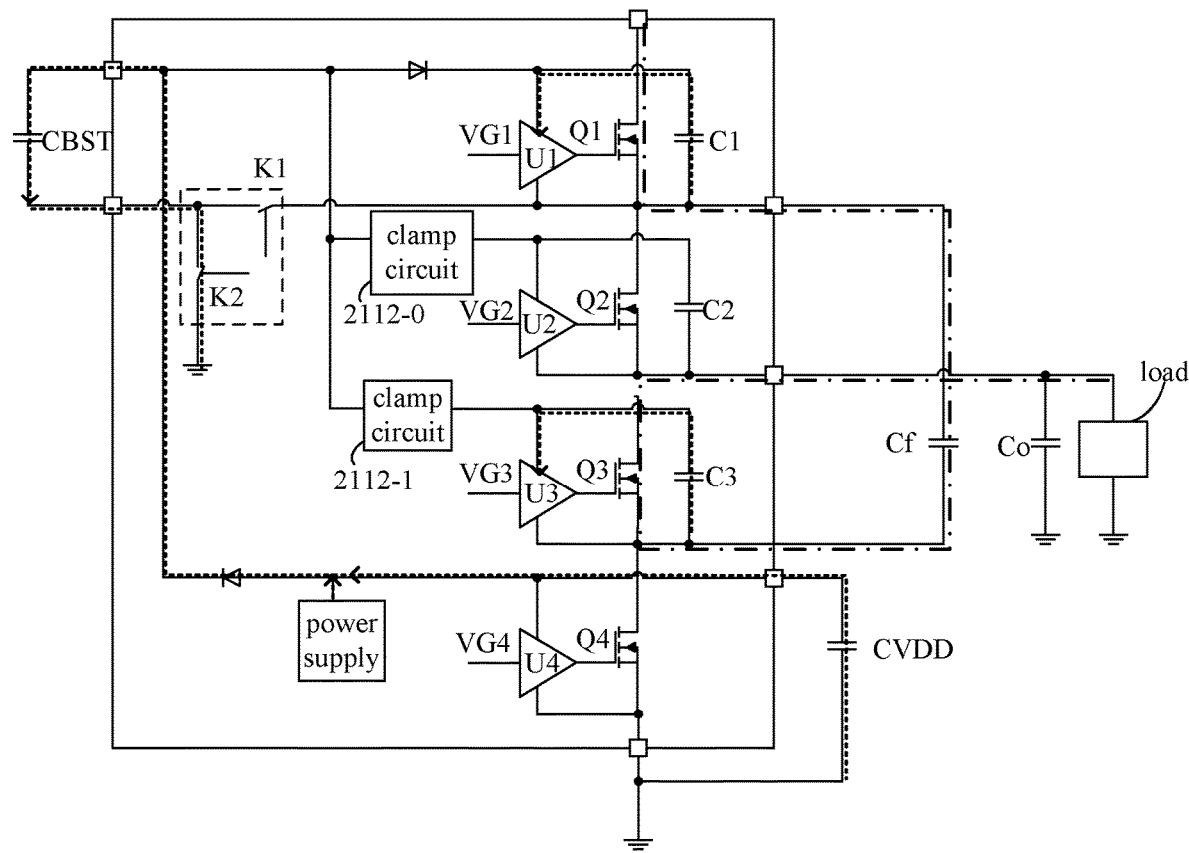
FIG. 6 is another schematic block diagram of example operation of the switch capacitor converter in the first time interval, in accordance with embodiments of the present invention.

Referring now to FIG. 6, shown is another schematic block diagram of example operation of the switch capacitor converter in the first time interval, in accordance with embodiments of the present invention. In this example, the switch capacitor converter can operate during a second part of time interval T1. Control signals VG1 and VG3 respectively corresponding to power switches Q1 and Q3 may both be active (e.g., VG1=1, VG3=1), and control signals VG2 and VG4 respectively corresponding to power switches Q2 and Q4 may both be inactive (e.g., VG2=0, VG4=0), during a second part of time interval T1. Here, the dashed line is the power supply path for the drive circuit to supply power to the drivers, and the dotted line is the power path of the switch capacitor converter.

Switch K2 in switch circuit 2111 can be controlled by control signal V2. During a second part of time interval T1, control signal V2 can be at a high level, and switch K2 may be turned on. Thus, one end of bootstrap capacitor CBST can be grounded, and the other end of bootstrap capacitor CBST may be coupled to power supply 212. In this way, bootstrap capacitor CBST can be charged by power supply 212. In addition, the drive voltages of drivers U1 and U3 can be maintained by the internal capacitors C1 and C3, respectively, during the second part of time interval T1 in the operation cycle.

Figure 7:
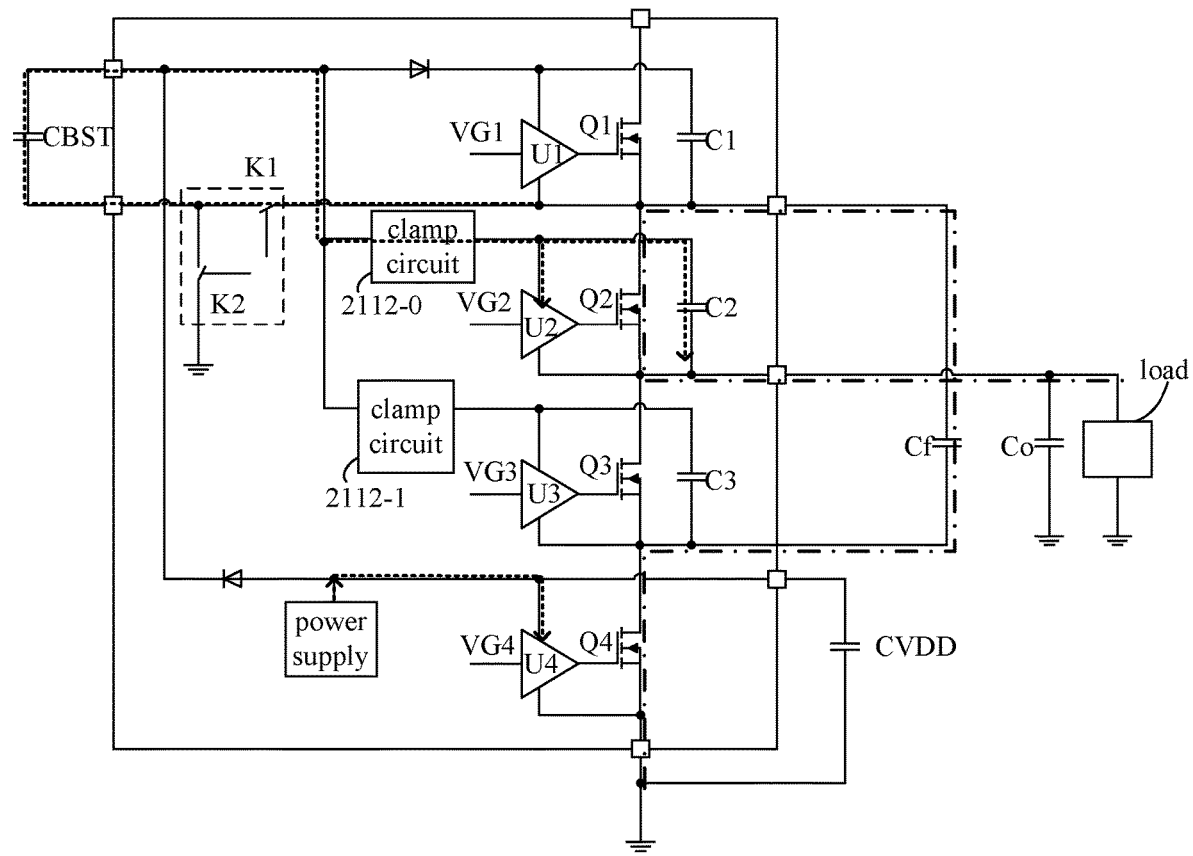
FIG. 7 is a schematic block diagram of example operation of the switch capacitor converter in the second time interval, in accordance with embodiments of the present invention.

Referring now to FIG. 7, shown is a schematic block diagram of example operation of the switch capacitor converter in the second time interval, in accordance with embodiments of the present invention. In this example, the switch capacitor converter may operate during a first part of time interval T2. Control signals VG1 and VG3 respectively corresponding to power switches Q1 and Q3 can both be inactive (e.g., VG1=0, VG3=0), and control signals VG2 and VG4 respectively corresponding to power switches Q2 and Q4 may both be active (e.g., VG2=1, VG4=1) during a first part of time interval T2. In this example, active high signals are utilize, the dashed line is the power supply path for the drive circuit to supply power to the drivers, and the dotted line is the power path of the switch capacitor converter.

Switch K1 in switch circuit 2111 can be controlled by control signal V1. During a first part of time interval T2, control signal V1 may be at a high level, and switch K1 can be turned on. Thus, one end of bootstrap capacitor CBST can effectively connect to the low voltage end of driver U1. Bootstrap capacitor CBST can supply power to driver U2 of the power switch Q2 through clamp circuit 2112-0 corresponding to driver U2, and control signal VG2 of power switch Q2 may be equal to 1, so driver U2 can activate drive signal to drive power switch Q2 to turn on. In general, the voltage across flying capacitor Cf is ½*Vin. Here, control signal VG4 of power switch Q4 may be equal to 1, and power supply 212 can supply power to driver U4 of the power switch Q4, so driver U4 can activate the drive signal to drive power switch Q4 to turn on. At this stage, power switch Q4 can be turned on, and the voltage at the second end of flying capacitor Cf may be zero, such that the voltage at the first end of flying capacitor Cf is ½*Vin. That is, the low voltage end of driver U2 is ½*Vin.

The voltage at the first end of bootstrap capacitor CBST can be the sum of the voltage across bootstrap capacitor CBST and ½*Vin, so the input voltage of clamp circuit 2112-0 corresponding to driver U2 with respect to the low voltage end of driver U2 (not with respect to the ground) at this stage can be the voltage across bootstrap capacitor CBST. Here, clamp circuit 2112-0 corresponding to driver U2 can reduce its output voltage to the acceptable operating voltage of driver U2 or to be equal to the voltage across bootstrap capacitor CBST, such as by linear voltage regulation. During time interval T2, power switches Q2 and Q4 can be turned on, and the voltage across flying capacitor Cf can supply power to the load via Cf-Q2-load-Q4. In addition, power switch Q2 may correspond to an internal capacitor, and bootstrap capacitor CBST can supply power to internal capacitor C2 corresponding to power switch Q2 during the first part of time interval T2 in the operation cycle.

Figure 8:
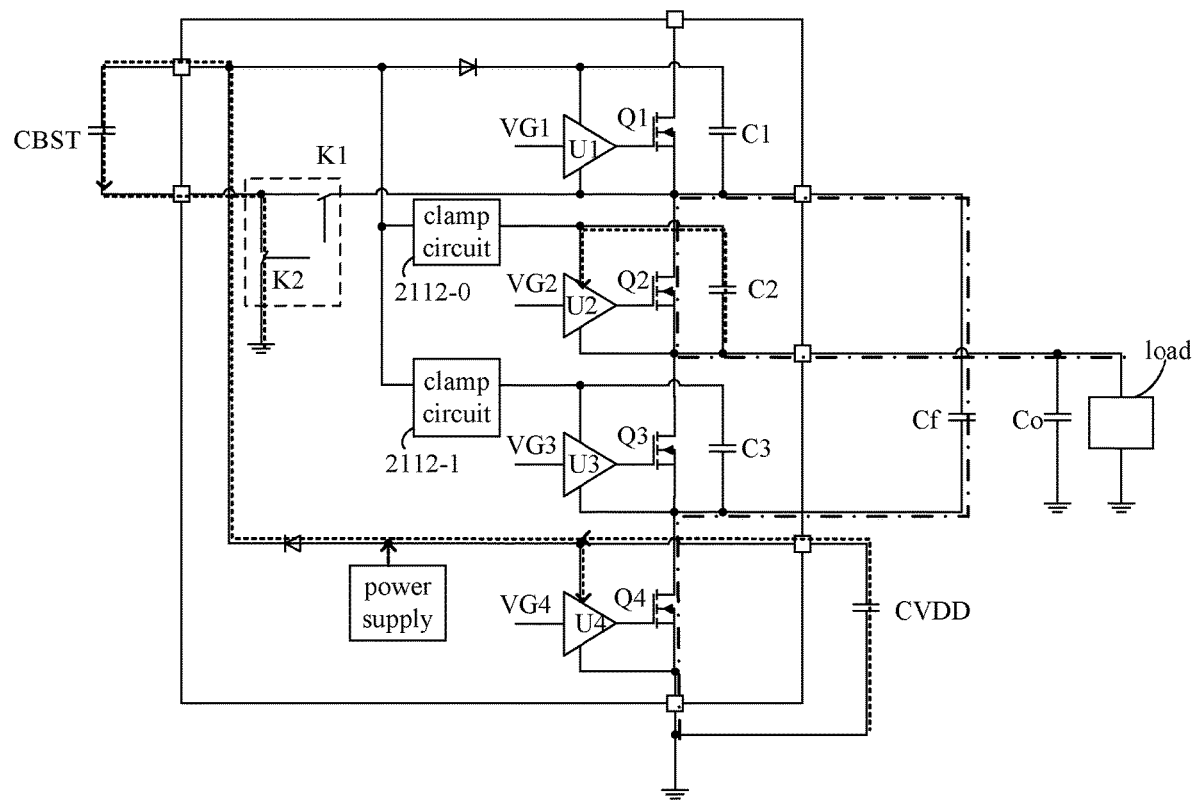
FIG. 8 is another schematic block diagram of example operation of the switch capacitor converter in the second time interval, in accordance with embodiments of the present invention.

Referring now to FIG. 8, shown is another schematic block diagram of example operation of the switch capacitor converter in the second time interval, in accordance with embodiments of the present invention. In this example, the switch capacitor converter works during a second part of time interval T2. Control signals VG1 and VG3 respectively corresponding to power switches Q1 and Q3 may both be inactive (e.g., VG1=0, VG3=0), and control signals VG2 and VG4 respectively corresponding to power switches Q2 and Q4 may both be active (e.g., VG2=1, VG4=1), during a second part of time interval T2. Here, the dashed line is the power supply path for the drive circuit to supply power to the drivers, and the dotted line is the power path of the switch capacitor converter.

Switch K2 in switch circuit 2111 can be controlled by control signal V2. During a second part of time interval T2, control signal V2 can be at a high level, and switch K2 may be turned on. Thus, one end of bootstrap capacitor CBST can be grounded, and the other end of bootstrap capacitor CBST can effectively connect to power supply 212. In this way, bootstrap capacitor CBST may be charged by power supply 212. In addition, the drive voltage of driver U2 can be maintained by the internal capacitor C2, and the drive voltage of driver U4 can be maintained by capacitor CVDD, during a second part of time interval T2.

Therefore, drive circuit 21 of certain embodiments may utilize a time-sharing control method to supply power to drivers U1-U4 of power switches Q1-Q4, such that only one bootstrap capacitor is required to drive power switches Q1-Q4, and the drive voltage of each driver is insured to be the same when power switches do not share the common ground. This can simplify the drive circuit of the switch capacitor converter, reduce the number of drive components, and save circuit costs.

Particular embodiments may also provide a drive method for a switch capacitor converter having a first, second, third, and fourth power switches connected in series. The method can include driving, by first, second, third, and fourth drivers, the first, second, third, and fourth power switches respectively according to control signals. The method can also include supplying, by a bootstrap power supply circuit, power to the first, second, and third drivers in a time-sharing manner, where the bootstrap power supply circuit includes a bootstrap capacitor. The method can also include supplying the fourth driver and charging the bootstrap capacitor, by a power supply, where the fourth power switch is grounded.

The power can be supplied, by the bootstrap power supply circuit, to the first and third drivers at the same time during a first part of a first time interval in an operation cycle. Also power can be supplied, by the bootstrap power supply circuit, to the second driver during a first part of a second time interval in the operation cycle. In addition the bootstrap capacitor can be charged, by the power supply, during a second part of the first time interval, and/or a second part of the second time interval, in the operation cycle.

Particular embodiments can also provide an integrated circuit that is applied to the switch capacitor converter, and the integrated circuit can include the above drive circuit. The integrated circuit may only utilize two pins to connect the external bootstrap capacitor (e.g., capacitor CBST). In addition, the internal capacitor (e.g., capacitors C1, C2, and C3) corresponding to each power switch can have a smaller capacitance and may be integrated internally without occupying any pins, thereby saving pins of integrated circuit.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A drive circuit for a switch capacitor converter having first, second, third, and fourth power switches connected in series, the drive circuit comprising:
   a) first, second, third, and fourth drivers configured to respectively drive the first, second, third power, and fourth power switches according to control signals;
   b) a bootstrap power supply circuit comprising a bootstrap capacitor configured to supply power to the first, second, and third drivers in a time-sharing manner, wherein a first end of the bootstrap capacitor is coupled to high voltage ends of the first, second, and third drivers, a second end of the bootstrap capacitor is selectively coupled to a low voltage end of the first driver or a ground, and the bootstrap capacitor is respectively coupled to the second and third drivers through a clamp circuit that is configured to clamp output voltages of the second and third drivers to a predetermined value; and
   c) a power supply configured to supply power to the fourth driver and charge the bootstrap capacitor, wherein the fourth power switch is grounded, and the predetermined value is equal to an output voltage of the power supply.

2. The drive circuit of claim 1, wherein a first end of a flying capacitor of the switch capacitor converter is coupled to a common node of the first power switch and the second power switch, and a second end of the flying capacitor is coupled to a common node of the third power switch and the fourth power switch.

3. The drive circuit of claim 1, wherein the first and third power switches are controlled to be turned on simultaneously, the second and fourth power switches are controlled to be turned on simultaneously, and on time intervals of the first and second power switches do not overlap.

4. The drive circuit of claim 1, wherein the bootstrap power supply circuit supplies power to the first and third drivers simultaneously during a first part of a first time interval in an operation cycle.

5. The drive circuit of claim 4, wherein the bootstrap power supply circuit supplies power to the second driver during a first part of a second time interval in the operation cycle.

6. The drive circuit of claim 5, wherein the bootstrap capacitor is charged by the power supply during a second part of the first time interval and/or during a second part of the second time interval, in the operation cycle.

7. The drive circuit of claim 5, wherein:
   a) the first and third power switches are controlled to be turned on during the first time interval in the operation cycle;
   b) the second and fourth power switches are controlled to be turned on during the second time interval in the operation cycle; and
   c) the first and second time intervals are controlled by duty cycles of the switch capacitor converter.

8. The drive circuit of claim 1, wherein:
   a) the first and third power switches respectively correspond to an internal capacitor;
   b) the bootstrap capacitor supplies power to the first driver, the third driver, and internal capacitors corresponding to the first power switch and the third power switch during a first part of a first time interval in an operation cycle; and
   c) during a second part of the first time interval in the operation cycle, the bootstrap capacitor is charged by the power supply, and internal capacitors corresponding to the first and third power switches respectively supply power to the first and third drivers.

9. The drive circuit of claim 8, wherein:
   a) the second power switch corresponds to an internal capacitor;
   b) the bootstrap capacitor supplies power to the second driver and the internal capacitor corresponding to the second power switch during a first part of a second time interval in the operation cycle; and
   c) during a second part of the second time interval in the operation cycle, the bootstrap capacitor is charged by the power supply, and the internal capacitor corresponding to the second power switch supplies power to the second driver.

10. The drive circuit of claim 1, wherein:
a) when the bootstrap power supply circuit supplies power to the first and third drivers or to the second driver, the second end of the bootstrap capacitor is coupled to the low voltage end of the first driver; and
b) when the bootstrap capacitor is charged by the power supply, the second end of the bootstrap capacitor is coupled to the ground.

11. The drive circuit of claim 1, wherein:
a) the bootstrap power supply circuit comprises a switch circuit for switching a connection node of the second end of the bootstrap capacitor;
b) the switch circuit comprises first and second switches;
c) the first switch is coupled between the second end of the bootstrap capacitor and the low voltage end of the first driver; and
d) the second switch is coupled between the second end of the bootstrap capacitor and the ground.

12. The drive circuit of claim 1, wherein when the first power switch is turned on, an input voltage of the clamp circuit corresponding to the third driver with respect to a low voltage end of the third driver is a sum of a voltage across the bootstrap capacitor and a voltage across a flying capacitor of the switch capacitor converter.

13. The drive circuit of claim 1, wherein when the fourth power switch is turned on, an input voltage of the clamp circuit corresponding to the second driver with respect to a low voltage end of the second driver is a voltage across the bootstrap capacitor.

14. A drive method for a switch capacitor converter having first, second, third, and fourth power switches connected in series, the method comprising:
a) respectively driving, by first, second, third, and fourth drivers, the first, second, third, and fourth power switches according to control signals;
b) supplying, by a bootstrap power supply circuit, power to the first, second, and third drivers in a time-sharing manner, wherein the bootstrap power supply circuit comprises a bootstrap capacitor, a first end of the bootstrap capacitor is coupled to high voltage ends of the first, second, and third drivers, a second end of the bootstrap capacitor is selectively coupled to a low voltage end of the first driver or a ground, and the bootstrap capacitor is respectively coupled to the second and third drivers through a clamp circuit that is configured to clamp output voltages of the second and third drivers to a predetermined value; and
c) supplying the fourth driver and charging the bootstrap capacitor, by a power supply, wherein the fourth power switch is grounded, and the predetermined value is equal to an output voltage of the power supply.

15. The method of claim 14, further comprising supplying, by the bootstrap power supply circuit, power to the first and third drivers at the same time during a first part of a first time interval in an operation cycle.

16. The method of claim 15, further comprising supplying, by the bootstrap power supply circuit, power to the second driver during a first part of a second time interval in the operation cycle.

17. The method of claim 16, further comprising charging, by the power supply, the bootstrap capacitor during a second part of the first time interval and/or during a second part of the second time interval, in the operation cycle.

18. An integrated circuit for a switch capacitor converter, comprising the drive circuit according to claim 1, and two pins that are configured to couple to the bootstrap capacitor.

* * * * *